United States Patent [19]

Kuntermann

[11] 4,369,364
[45] Jan. 18, 1983

[54] MONITORING DEVICE WITH AN OPTICAL SENSOR FOR THE DETECTION OF INTERFERENCE ARCS IN ELECTRICAL SYSTEMS

[75] Inventor: Jurgen H. Kuntermann, Burgstetten, Fed. Rep. of Germany

[73] Assignee: BBC Brown, Boveri & Company Limited, Baden, Switzerland

[21] Appl. No.: 200,492

[22] PCT Filed: Jul. 13, 1979

[86] PCT No.: PCT/CH79/00099
§ 371 Date: Aug. 27, 1980
§ 102(e) Date: Aug. 27, 1980

[87] PCT Pub. No.: WO80/01442
PCT Pub. Date: Jul. 10, 1980

[30] Foreign Application Priority Data
Dec. 27, 1978 [DE] Fed. Rep. of Germany ....... 2856188

[51] Int. Cl.³ .............................................. G02B 5/14
[52] U.S. Cl. .................................... 250/227; 250/239
[58] Field of Search ............... 250/227, 239, 573, 574; 350/96.25, 96.26

[56] References Cited

U.S. PATENT DOCUMENTS 3,952,196  4/1976  Larsen ................................. 250/578
4,029,391  6/1977  French ................................ 250/227
4,040,743  8/1977  Villaume et al. .................... 250/227
4,067,052  1/1978  Neuhoff .............................. 361/42

OTHER PUBLICATIONS

"Design of a Fiber Optic Pressure Transducer", by R. H. Pahler, Jr., et al., Mechanical Engineering, Mar. 1976, p. 105.
"Arc Monitor—a short-circuit protection for indoor switchgear", by Walter Pucher, ASEA Journal, 1976, vol. 49, No. 6, p. 137.

Primary Examiner—David C. Nelms
Attorney, Agent, or Firm—Oblon, Fisher, Spivak, McClelland & Maier

[57] ABSTRACT

A monitoring system with an optical sensor for the detection of interference arcs in electrical systems, particularly in enclosed SF₆-insulated high voltage systems. The system improves the reliability of the sensor by means of a test light impulse supplied from outside the enclosure by examining the exit surface as well as the entry surface on the sensor for the light beam for turbidity by means of a light-diffusing coating on the surface. To that end, the sensor has at least a second photoconductor with an external light source for the production of test light impulses and the test light impulse is led through a portion of the space to be monitored before it enters again into the sensor and the first photoconductor.

10 Claims, 3 Drawing Figures

MONITORING DEVICE WITH AN OPTICAL SENSOR FOR THE DETECTION OF INTERFERENCE ARCS IN ELECTRICAL SYSTEMS

BACKGROUND OF THE INVENTION

1. Field of the Invention

The invention refers to a monitoring device with an optical sensor for the detection of interference arcs in electrical systems, particularly in enclosed, $SF_6$-insulated high voltage systems, containing a gas-tight installed photoconductor to lead out the interference light.

2. Description of the Prior Art

The increasing energy density in the interconnection as well as the transition to higher transmission voltages make it necessary to improve the protection of the power supply system. In this context, it is essentially a question of increasing the reliability of the protection of the power supply system. The sensing devices used in the system protection, such as sensors for the detection of interference arcs in electrical systems, belong among the essential and most important components for the functional safety of the system as the first member in the path of the signal flow.

A system is described in the German Disclosure Publication No. 24 47 240 where a photoconductor is used as a sensor for the detection and signaling of a light occurring in an enclosed container. A functional monitoring of the sensor is not effected. However, due to the reasons given in the introduction, it has become necessary in the meantime to improve the protection of the system and thus to also include the sensors into a functional control besides the central unit of the protection system.

Furthermore, the German Disclosure Publication No. 22 16 238 contains a system for the protection of enclosed, pressure gas insulated electrical systems against interference arcs the sensors of which consist of a light-sensitive element, for example, a photocell. The light-sensitive elements arranged within the enclosure of an electrical system are each provided directly with a light source as a functional control. The light-sensitive element, for example, a photocell, as well as the light source used for test purposes, for example, an electric bulb, are active parts of the sensor and thus are subject to wear which reduces the reliability of the sensor; the sensor must, therefore, be replaced at certain time intervals for which purpose the enclosure of the electrical system must be opened which proves to be costly.

SUMMARY OF THE INVENTION

The invention is based on the task of improving the reliability of the sensors by means of a test light impulse supplied from outside the enclosure.

This task is accomplished according to the invention by the fact that the sensor has at least a second photoconductor connected with an external light source for the production of test light impulses and that the test light impulse is led through a portion of the space to be monitored before it enters again into the sensor and the first photoconductor.

An expedient continued development of the invention can consist of the fact that the sensor has a transparent protective cylinder in which the two photoconductors are arranged in axial direction, that the protective cylinder is designed as a collective lens at its front end for the bundling of the test light impulses and that a reflector is arranged in front of the collective lens at a certain distance. It can also be advantageous that the photoconductor leading the test light impulse is bent and arranged in such a way that the test light impulse emerging from its free end into the space to be monitored enters directly again into the sensor.

It is also possible to comprise both photoconductors to form a multi-armed photoconducting bundle consisting of a transmitter bundle and a receiver bundle. A multi-armed photoconducting bundle with a circular cross-section can, for example, have two semi-circular partial cross-sections or a circular ring with a small circle enclosed therein for the transmitter bundle and the receiver bundle.

The advantages achieved with the invention consist especially of the fact that it is a question of a passive sensor which has, thus, no active parts subject to wear and operates, therefore, with a high degree of reliability. This produces, furthermore, a favorable effect for the functional safety in that the test light impulse passes through a portion of the space of the electrical system to be monitored and, in its radiation path over the reflector or the correspondingly bent photoconductor, enters again into the sensor after leaving the gas chamber whereby the exit point as well as the entry point, here a collective lens, and the reflection point are examined for turbidity by means of a light-diffusing coating on its surface ($SF_6$ decomposition products). Thus, the sensor as well as its connecting path to the evaluation unit including the optoelectronic transformation are fully covered by the functional control so that, also in case of an interference arc, the light impulse connected with it is safely detected by the sensor and passed on to the evaluation unit. Moreover, the sensor is not metallic so that the field line course is only little influenced.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
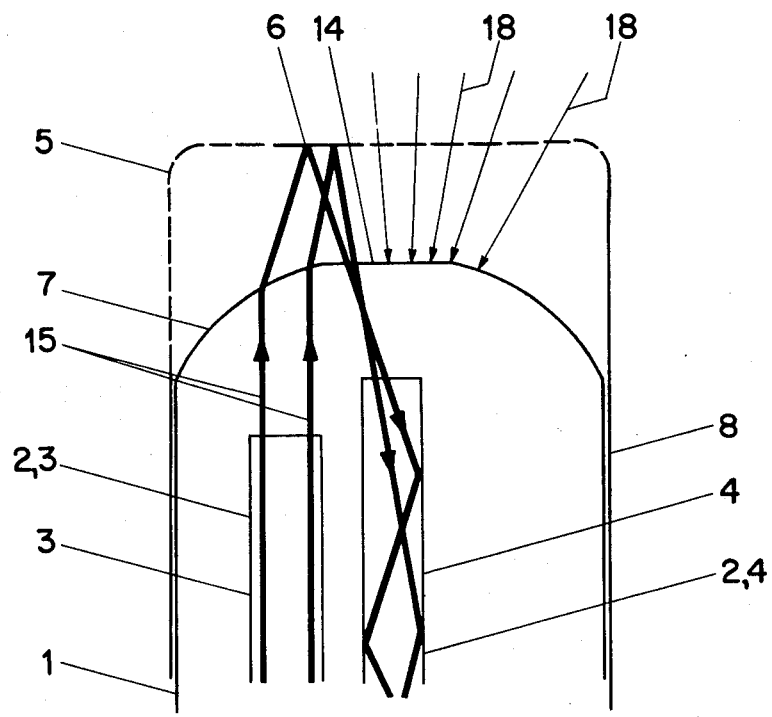
FIG. 1 is a schematic diagram illustrating the details of a sensor with a schematic representation of the deviation of a test light impulse over a reflector.

Referring now to the drawings, wherein like reference numerals designate identical or corresponding parts throughout the several views, and more particularly to FIG. 1 thereof, there is illustrated the details of the design of the head portion of a passive sensor by means of which the functional control is achieved. The sensor has a protective cylinder 1 made of "acrylic resin" which contains two blind holes 2.3, 2.4 running in axial direction and in parallel towards each other towards the front end and each of which serves to receive a photoconductor 3, 4. A test light impulse 15 is supplied to the sensor through the photoconductor 3 which is deflected by a reflector 5 arranged in front of the front end of the protective cylinder at a certain distance in such a manner that it enters again the photoconductor 4 after passing a short way through the space of the electrical system to be monitored. The reflector 5 is designed cup-shaped from a perforated metal sheet and placed on the front end of the protective cylinder 1. The reflector 5 has a metallic mirror 6 in the reflection area. The protective cylinder 1 is designed as a collective lens 7 at its front end for the bundling of the test light impulses 15 which has a flattened area 14 close to the optical axis, i.e. above the photoconductor 4 in the re-entry area of the reflected test light impulses 15. In order to prevent that scattered light from the photoconductor 3 gets directly into the photoconductor 4, the photoconductor 3 is arranged in a recessed manner in axial direction in comparison with the photoconductor 4.

Since the test light impulse touches in its radiation path three, possibly coated surfaces, i.e. the exit surface and the entry surface of the sensor as well as the reflector, the test light impulse reacts in a very sensitive manner to a turbidity.

Figure 2:
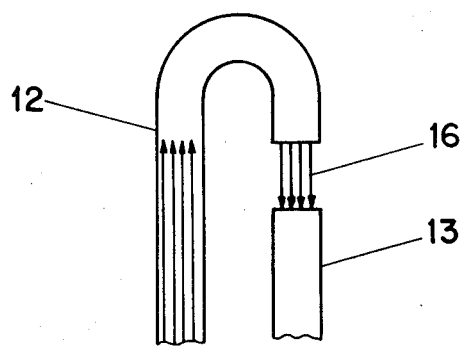
FIG. 2 is a schematic diagram illustrating the details of a sensor with a schematic representation of the deviation of a test light impulse by means of a correspondingly bent photoconductor.

Another exemplified embodiment is laid down in FIG. 2 showing a passive sensor. In order to deflect the test light impulses 16, the free end of the photoconductor 12 supplying the test light impulses is bent by 180° so that its light exit surface as well as the light entry surface of the photoconductor 13 are directly opposite each other by maintaining a certain distance from each other so that now the test light impulses 16 emerge from the photoconductor 12, pass a certain distance through the space of the electrical system to be monitored and enter then again into the photoconductor 13 of the sensor. In this way, the test light impulses 16 enter into the sensor also from outside, i.e. from the gas chamber of the electrical system as in the exemplified embodiment 1 (FIG. 1) and test thus the light entry points of the same for turbidity by means of a light-diffusing coating on the surface. Thus, also in case of an interference arc, the light impulse 18 connected with it is safely detected by the sensor.

Figure 3:
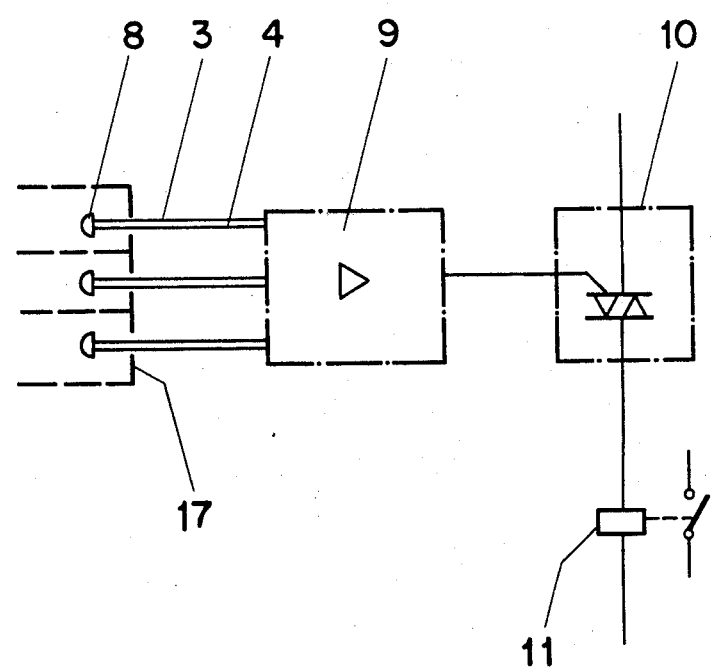
FIG. 3 is a functional diagram of the sensor in connection with an evaluation unit and the transfer circuit for a fast ground in a schematic representation.

The passive sensors 8 shown in FIG. 3 are arranged within the enclosure 17 of an $SF_6$-insulated high voltage system whereby, with a compartmentalized system, at least one sensor 8 is in each compartmentalized space. The photoconductors 3, 4 of the sensors are connected with an evaluation unit 9 which contains a photoelectric amplifier system in which the light impulse is transformed into an electrical impulse over a photodiode for further processing of the signal. For the energy form transformation of the optical signal, the photoelectric amplifier entry system can also be provided with a photoresistance or with a phototransistor.

The evaluation unit contains additionally a test impulse generator for the production of test light impulses which, supplied to the sensor 8 over the photoconductor 3, pass through a short distance of the space of the electrical system to be monitored and are then deflected by a reflector in such a manner that they enter again into the photoconductor 4 of the sensor from the gas chamber and pass on to the evaluation unit 9. The evaluation unit 9 controls a triac 10 in the transfer circuit as amplifying member which, in its turn, actuates a tripping relay 11 which acts with its contact upon an explosive-actuated fast ground which is not shown in detail and which goes into grounding position within a very short period of time and thus short-circuits the interference arc and extinguishes it.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A monitoring device for the detection of interference arcs in an electrical system, particularly in an enclosed $SF_6$-gas-insulated high voltage system, comprising:

a passive non-metallic optical sensor comprising, a transparent protective cylinder defining an axis and having first and second photoconductors arranged in parallel with each other and the cylinder axis, said photoconductors disposed gas-tightly in said system, said first conductor provided to lead out of said system light impulses produced by an interference arc, an external light source coupled to said second photoconductor for the production of test light impulses to be transmitted through said second photoconductor, and means for passing the test light impulses transmitted through said second photoconductor through a portion of the space within said system being monitored and to said first photoconductor, including a collective lens for focusing said test light impulses passed through said portion of said space at said first photoconductor as said test light impulses enter said first photoconductor.

2. A monitoring device according to claim 1, comprising:

a reflector arranged in front of the collective lens at a predetermined distance.

3. A monitoring device according to claim 2, comprising:

the protective cylinder having the collective lens integrally formed, wherein the integrally formed lens is positioned between said reflector and said photoconductors.

4. A monitoring device according to claim 1, comprising:

the protective cylinder consisting of a material different from that of the collective lens.

5. A monitoring device according to claims 1 or 2, comprising:

the collective lens having a flattened area in the range of the optical axis.

6. A monitoring device according to claim 5, comprising:

the collective lens consisting of a material having a refractive index higher than that of $SF_6$ (sulfuric hexafluoride).

7. A monitoring device according to claim 6, wherein the collective lens consists of an acrylic resin.

8. A monitoring device according to claims 2 or 3, comprising:

the reflector made of a perforated material in the form of a basket and mounted on the collective lens, and the reflector having a metal mirror or a reflective surface in the reflection area.

9. A monitoring device according to claim 8, comprising:
the second photoconductor arranged axially recessed in comparison with the first photoconductor.

10. In a monitoring device for the detection of interference arcs in an electrical system, particularly in an enclosed $SF_6$-gas-insulated high voltage system, an improved sensor comprising:

a first photoconductor coupled gas-tightly to said system for leading out therefrom light impulses of an interference arc;

a light source external to said system for the production of test impulses;

a second photoconductor having one end coupled to said light source and another end gas-tightly protruding in said system, said second photoconductor having a bent portion within said system such that said another end faces said first photoconductor such that test impulses from said light source are transmitted via said first photoconductor through a portion of the space being monitored within said system and enters directly into said first photoconductor.

* * * * *